United States Patent
Shrivastava et al.

(10) Patent No.: US 11,307,734 B1
(45) Date of Patent: *Apr. 19, 2022

(54) DYNAMIC CONTROLLED-ENVIRONMENT FACILITY RESIDENT COMMUNICATION AND/OR MEDIA DEVICE USER INTERFACES

(71) Applicant: Securus Technologies, LLC, Carrollton, TX (US)

(72) Inventors: Amit Kumar Shrivastava, Montréal (CA); Isaac Parampottil, Coppell, TX (US)

(73) Assignee: Securas Technologies, LLC, Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/127,139

(22) Filed: Dec. 18, 2020

(51) Int. Cl.
*G06F 3/048* (2013.01)
*G06F 3/04817* (2022.01)

(52) U.S. Cl.
CPC .................. *G06F 3/04817* (2013.01)

(58) Field of Classification Search
CPC ....... G06F 2009/45583; G06F 9/45558; G06F 9/45533; G06F 9/4843; G06F 9/45545; G06F 3/04817
See application file for complete search history.

(56) References Cited

U.S. PATENT DOCUMENTS

| | | | | |
|---|---|---|---|---|
| 6,738,809 B1* | 5/2004 | Brisebois | ................ | H04L 41/22 345/172 |
| 9,472,071 B1* | 10/2016 | Passe | ..................... | H04N 7/181 |
| 10,033,965 B1* | 7/2018 | Clements | ........... | G06K 9/00255 |
| 10,250,645 B1* | 4/2019 | Smith | ..................... | G06F 21/45 |
| 2002/0075319 A1* | 6/2002 | Hochmuth | .......... | G06F 3/04817 715/810 |
| 2007/0038570 A1* | 2/2007 | Halbritter | .............. | G06Q 10/10 705/50 |
| 2007/0083827 A1* | 4/2007 | Scott | ................. | H04M 1/72472 715/811 |
| 2008/0068447 A1* | 3/2008 | Matti | ..................... | H04N 7/147 348/14.08 |
| 2010/0031194 A1* | 2/2010 | Kawaguchi | ............. | G06F 9/445 715/810 |
| 2013/0011819 A1* | 1/2013 | Horseman | ................ | A61B 5/72 434/257 |

(Continued)

*Primary Examiner* — Linh K Pham
(74) *Attorney, Agent, or Firm* — Fogarty LLP

(57) ABSTRACT

Embodiments of systems and methods may dynamically arrange icons on a screen of a controlled-environment facility resident communication and/or media device in accordance with criteria selected or defined by a controlled-environment facility housing a controlled-environment facility resident operating the device, and/or criteria selected or defined by a controlled-environment facility vendor, in compliance with rules and regulations of the facility housing the resident as applicable with respect to the resident. This criteria may include arranging the icons based on frequency of use of the application program (app), bandwidth availability revenue to the facility and/or vendor, time remaining for the resident to reside in the facility, a classification of the resident with respect to the facility, an upcoming or occurring holiday, offence(s) a resident-incarcerated individual has been convicted of and/or is incarcerated for, and/or the like.

17 Claims, 4 Drawing Sheets

(56) References Cited

U.S. PATENT DOCUMENTS

| | | | |
|---|---|---|---|
| 2013/0058469 A1* | 3/2013 | Gongaware | H04M 3/382 |
| | | | 379/93.03 |
| 2017/0126689 A1* | 5/2017 | Lloyd | H04L 61/1594 |
| 2018/0137932 A1* | 5/2018 | Fiedler | G06F 16/25 |
| 2019/0364053 A1* | 11/2019 | Clements | H04L 63/108 |
| 2020/0371648 A1* | 11/2020 | Huang | H04M 1/72472 |

* cited by examiner

DYNAMIC CONTROLLED-ENVIRONMENT FACILITY RESIDENT COMMUNICATION AND/OR MEDIA DEVICE USER INTERFACES

TECHNICAL FIELD

The present disclosure relates generally to communication and media use by residents of controlled-environment facilities, more particularly to providing dynamic controlled-environment facility resident communication and/or media device user interfaces, and specifically to dynamic presentation of icons for available application programs on controlled-environment facility resident communication and/or media device user interfaces.

BACKGROUND

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including individual-to-individual videoconferences and online chat sessions. Other types of communication available to controlled-environment residents include the ability to exchange email and canned text messages between residents and non-residents of the controlled-environment facility. Basically, all of these forms of communication aim to facilitate communication between a resident of a controlled-environment facility and a non-resident. Traditional methods for dissemination of education or entertainment media in controlled-environment facilities have included print libraries, or the like.

More recently, jails and prisons have begun to allow incarcerated individuals to use portable electronic devices, such as smartphones, media devices, tablet computing devices, or the like, to facilitate contact with friends and family and for entertainment and education. Typically, residents of controlled-environment facilities, particularly controlled-environment facilities such as correctional institutions, are not allowed access to, or have very limited access to, streaming content. Similarly, unrestricted and/or untethered access to wireless data communication systems is not typically allowed, such as for security reasons. That is to say, typically, there are security concerns in a controlled environment facility that result in a need for tightly controlled media.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods which provide a dynamically arranged controlled-environment facility resident user interface on a controlled-environment facility resident communication and/or media devices. Therein, a controlled-environment facility resident user interface runs on top of, or as part of, an operating system of a controlled-environment facility resident communication and/or media device, such as a personal controlled-environment facility resident communication and/or media device or a communal controlled-environment facility resident communication and/or media terminal. The interface may request and accept identification information from a controlled-environment facility resident operating the controlled-environment facility resident communication and/or media device, verify the identification information and present icons to launch application programs (apps) available for use by the controlled-environment facility resident on a screen of the controlled-environment facility resident communication and/or media device. In accordance with implementations of the present systems and methods, the interface may dynamically arrange the icons on the screen of the controlled-environment facility resident communication and/or media device in accordance with criteria selected or defined by the controlled-environment facility housing the controlled-environment facility resident or a controlled-environment facility vendor, in compliance with rules and regulations of the facility housing the resident as applicable with respect to the resident.

The criteria selected or defined by the controlled-environment facility housing the controlled-environment facility resident or the controlled-environment facility vendor may include arranging the icons on the screen of the controlled-environment facility resident communication and/or media device in an order: with the icons for most frequently (often) used apps presented first; with the icons for apps having the greatest bandwidth availability at the time presented, presented first; with the icons for apps providing the most revenue to the respective one of the facility housing the resident or the controlled-environment facility vendor presented first; in an order based at least in part on a time remaining for the resident to reside in the facility housing the resident; in an order based at least in part on a classification of the resident with respect to the facility housing the resident; with the icons for apps related to an upcoming or occurring holiday presented first; in an order based at least in part on an one or more offences a resident-incarcerated individual has been convicted of and/or is incarcerated for; and/or the like.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
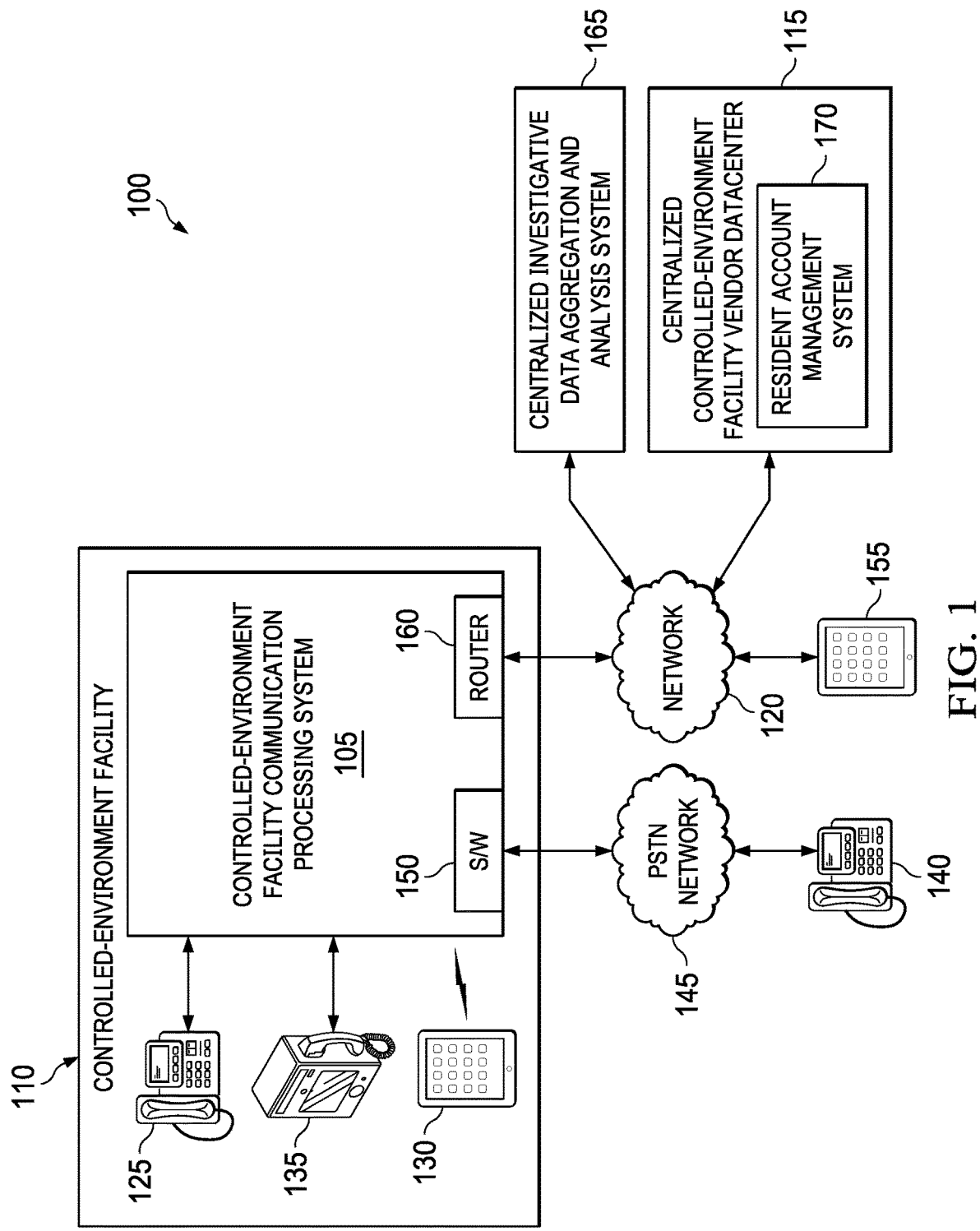
Figure 2:
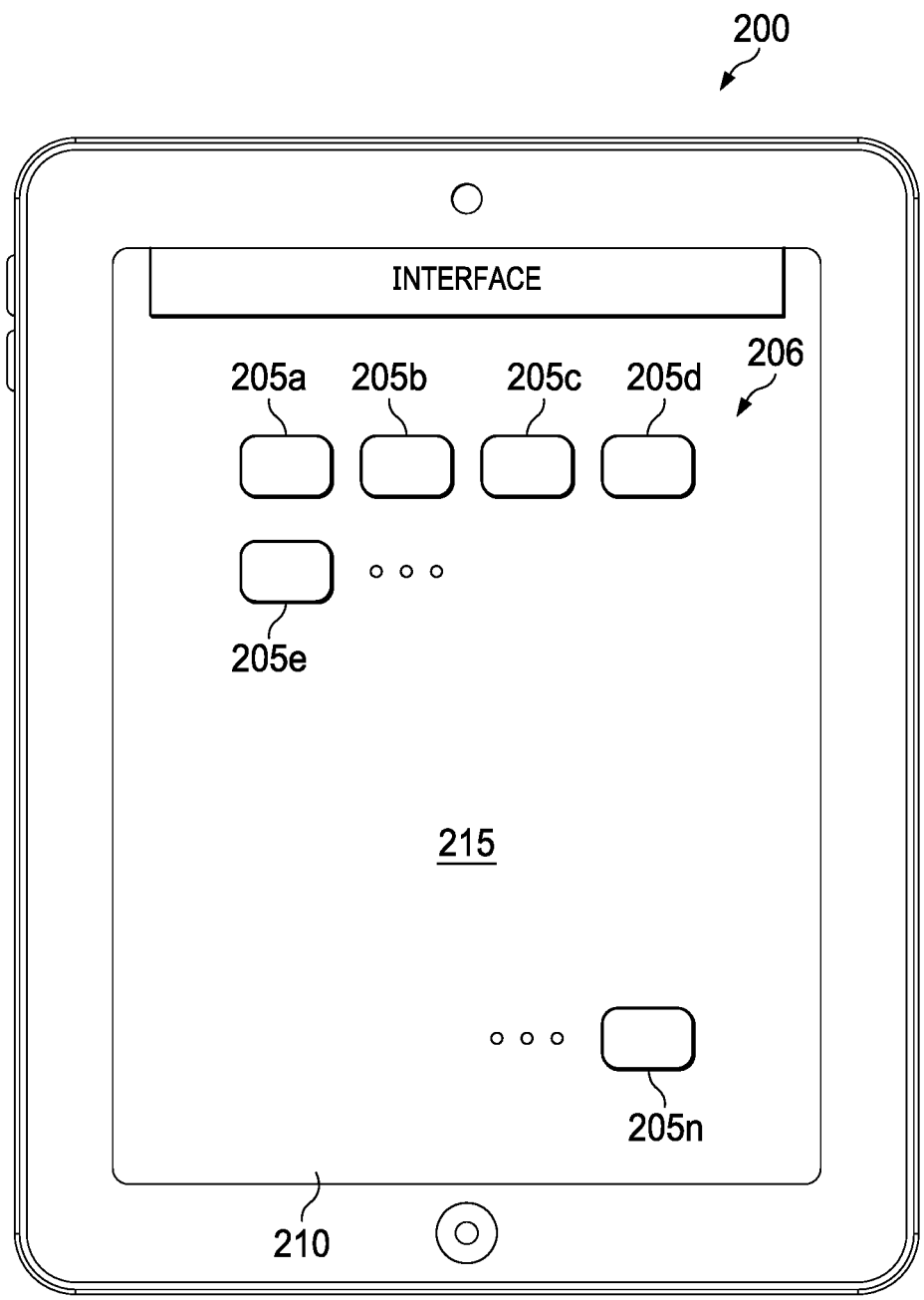
Figure 3:
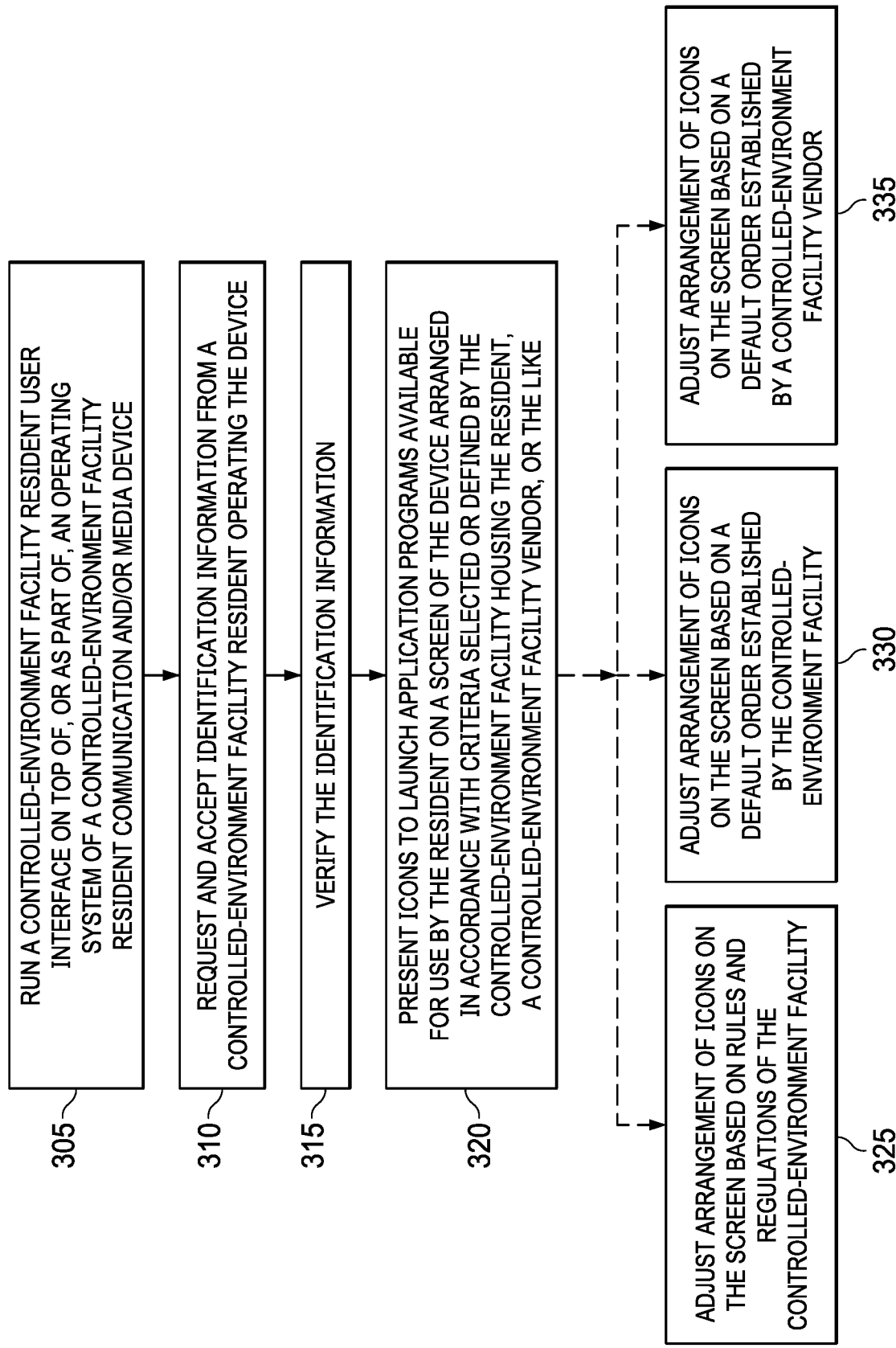
Figure 4:
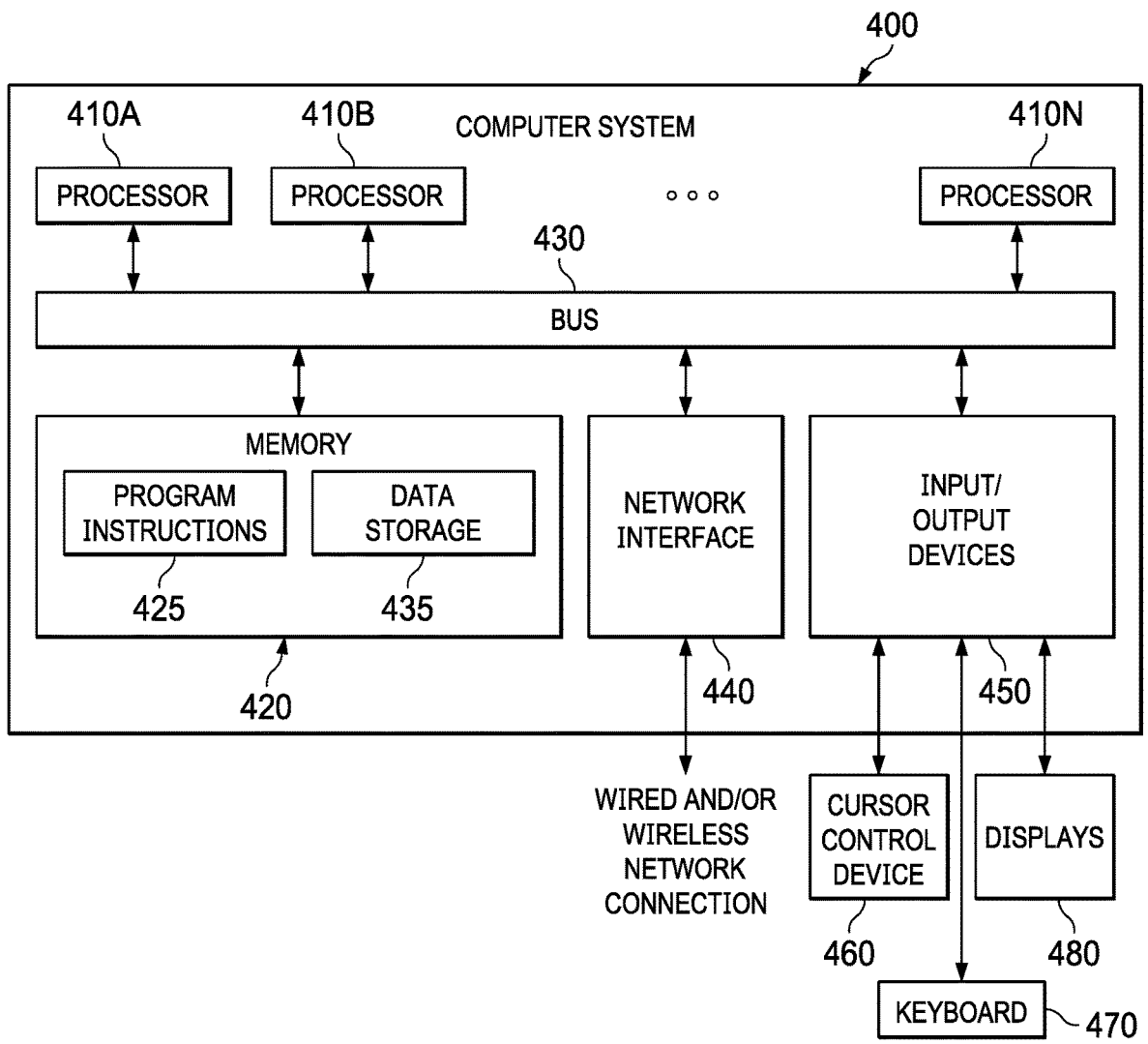

Having thus described the invention in general terms, reference will now be made to the accompanying drawings, which are not necessarily drawn to scale, and wherein:

FIG. 1 is a block diagram of an example controlled-environment, wherein an example embodiment of the present systems and methods for dynamic presentation of icons for available application programs (apps) on controlled-environment facility resident communication and/or media device user interfaces may be employed, in accordance with some embodiments;

FIG. 2 is a diagrammatic illustration of an example personal controlled-environment resident communication and/or media device, showing dynamic presentation of resident-available app icons on a controlled-environment facility resident communication and/or media device user interface, according to some embodiments;

FIG. 3 is a flowchart of an example process for dynamically presenting resident-available app icons on a controlled-environment facility resident communication and/or media device user interface, according to some embodiments; and FIG. 4 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as incarcerated individuals, arrestees, or detainees. It should be understood, however, that the systems and methods described herein may be similarly applicable to other types of controlled-environment facilities and their respective residents (e.g., a hospital and its patients, a school dormitory and its students, etc.).

Embodiments of the present systems and methods relate generally to communication and media use by residents of controlled-environment facilities, relating more particularly to providing dynamic controlled-environment facility resident communication and/or media device user interfaces, and specifically relate to dynamic presentation of icons for available application programs (apps) on controlled-environment facility resident communication and/or media device user interfaces.

Typically, media devices come with standard interface view, which is sometimes not user friendly, convenient, etc. For example, the location and priority of app icons on the screen of a controlled-environment facility resident communication and/or media device are predetermined either through development (e.g., as pre-determined by a vendor when developing the controlled-environment facility resident communication and/or media device), during provisioning (e.g., as pre-determined by the controlled-environment facility (and implemented by the vendor providing the controlled-environment facility resident communication and/or media device), by the user, etc. Embodiments of the present systems and methods, present app icons on the controlled-environment facility resident communication and/or media device dynamically arranged in accordance with criteria, such as may be selected and/or defined by the controlled-environment facility housing the controlled-environment facility resident, a controlled-environment facility vendor, or the like. As a result, a resident-user scrolling to see and use controlled-environment facility resident communication and/or media device apps may be reduced. However, such criteria may need to be in compliance with rules and regulations of the facility housing the resident as applicable with respect to the resident.

In accordance with embodiments of the present systems and methods, correlation of a resident/incarcerated individual login (incarcerated individual or resident identification (ID) such as a custody account number) and personal identification number (PIN)) to determine how apps will be presented on the controlled-environment facility resident communication and/or media device the resident/incarcerated individual is logging onto, based, for example, criteria selected or defined by a controlled-environment facility housing a controlled-environment facility resident operating the device, criteria selected or defined by a controlled-environment facility vendor, and/or the like, in compliance with rules and regulations of the facility housing the resident as applicable with respect to the resident. This criteria may include arranging the icons based on frequency of use of the app, bandwidth availability revenue to the facility and/or vendor, time remaining for the resident to reside in the facility, a classification of the resident with respect to the facility, an upcoming or occurring holiday, offence(s) a resident-incarcerated individual has been convicted of and/or is incarcerated for, and/or the like. Embodiments of the present systems and methods, not only provide a convenience factor and make controlled-environment facility resident communication and/or media devices more user friendly, by saving resident/incarcerated individual time scrolling through unused apps, but also frees up resources such as communal controlled-environment facility resident communication and/or media device (terminals), controlled-environment facility bandwidth, etc.

Icons are arranged "dynamically" in accordance with embodiments of the present systems and methods in that the arrangement of the icons is "continuously" updated, in accordance with at least one embodiment of the present systems and methods. For example, at each log-on of a resident-user, or the like, the arrangement of the icons may be adjusted, in accordance with at least one embodiment of the present systems and methods. Additionally, or alternatively, each time the resident-user returns to a "home screen," or the like, the arrangement of the icons may be adjusted, in accordance with at least one embodiment of the present systems and methods. FIG. 1 is a block diagram of example controlled-environment 100, wherein an example embodiment of the present systems and methods for dynamic presentation of icons for resident-available apps on controlled-environment facility resident communication and/or media device user interfaces may be employed, in accordance with some embodiments. In environment 100, controlled-environment facility communication processing system 105 may provide telephone services, videoconferencing, online chat, and other communication services to residents of controlled-environment facility 110. In some cases, such as illustrated, controlled-environment facility communication processing system 105 may be co-located with controlled-environment facility 110. Alternatively, or additionally, an external centralized communications processing system may be deployed in a controlled-environment facility vendor (e.g. a controlled-environment facility communications provider) datacenter 115, or the like. That is, controlled-environment facility communication processing system 105 may be centrally and/or remotely located with respect to one or more controlled-environment facilities and/or may provide communication services to multiple controlled-environment facilities, in which case, controlled-environment facility 110 is illustrated as one example. Such a controlled-environment facility vendor datacenter may be connected to such facilities via a public network (e.g. the Internet) or a private network (e.g. intranet) 120, or the like (e.g. via a secure tunneling protocol over the internet, using encapsulation). More generally, however, it should be noted that controlled-environment facility communication system 105 may assume a variety of forms, including telephony switches such as electronic switching systems, or the like, and/or and may be configured to serve a variety of facilities and/or users, whether within or outside of a controlled-environment facility.

Residents may use more-or-less conventional telephones 125 to access certain communication services. However, in accordance with embodiments of the present systems and methods, residents may also use a controlled-environment facility resident communication and/or media device 130, or the like. For example, personal computer wireless devices, such as a tablet computing device or smartphone (130), which may have been adapted and/or approved for use in controlled-environment facility, may be used by controlled-environment facility residents for communication. Such a personal resident device may be referred to as a "personal controlled-environment facility resident communication and/or media device," an Intelligent Resident Device (IRD), or the like, in controlled-environment facilities, in general. These may also be referred to as an "incarcerated individual personal communications and/or media device," an Intelligent Incarcerated individual Device (IID), or the like, in a correctional institution environment.

Additionally, or alternatively, a resident may use a "communal controlled-environment facility resident communication and/or media terminal" 135, or the like, to place voice calls, as well as for video communication, execution of other apps, including media apps, games, job search apps, etc. Such a controlled-environment facility video communication terminal may be referred to as an Intelligent Facility Device (IFD), which may be a video phone particularly adapted for use in a controlled-environment facility. Generally speaking, multiple controlled-environment facility resident communal communication and/or media terminals/IFDs 135 are disposed in a controlled-environment facility, and may be disposed in a visitation room, in a pod, as part of a kiosk, as an alternative to a controlled-environment facility communication kiosk, etc. As will be appreciated, IRD 130, IFD 135, or other similar devices have video conferencing capabilities, or the like, to enable a party to participate in video communication sessions with other call parties, such as non-residents of the controlled-environment facility, via video communication, secure online chat, etc. In some cases, IFD 135 may assume the form of any computer, tablet computer, smart phone, etc., or any other consumer device or appliance with videoconferencing capabilities. For example, in a correctional facility environment a tablet computing device (e.g., an IRD 130) may be mounted on a wall, in a hardened case, as a controlled-environment facility resident communal communication and/or media terminal or IFD 135. IFD 135 may also take the form of a docking station adapted to support and interface with an IRD 130 to provide communication, data, or other services.

Personal controlled-environment facility resident communication and/or media devices, IRDs 130, may be tablet computing devices, smartphones, media players, smart watches, or the like adapted and/or approved for use by residents of the controlled-environment facility (within the controlled-environment facility). Each IRD 130 may be particularly adapted for use in a controlled environment. For example, in a correctional institution, jail, or the like, such an IRD, or IID, may have a specifically adapted operating system and/or may be "stripped-down," particularly from the standpoint of what apps and/or hardware are provided or allowed on IRD 130, and/or connectivity afforded such an IRD. For example, such an IRD may employ an operating system kernel built for use in such an IRD in a controlled-environment facility. As a further example, the IRD may be adapted to only connect to a network provided by the controlled-environment facility, and/or in only certain locations, within the controlled-environment facility, such as may be controlled by availability of Wi-Fi access, or the like, only being available in certain areas. That is, for example, where streaming and/or downloading may be compartmentalized, leveraging the (concrete and steel) structure (i.e. construction, layout, etc.) of the controlled-environment facility, for example, limiting the availability of a Wi-Fi signal, providing the stream through the placement of wireless access points, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like. Also, in accordance with embodiments of the present systems and methods, the IRD may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRDs might include apps of particular interest to residents of the controlled-environment facility. For example, IRDs provided to incarcerated individuals of correctional facilities, might include apps that may be of particular use to an incarcerated individual, in general, such as access to a legal research service, or of more specific interest, such as providing an incarcerated individual nearing release, access to employment searching apps or the like. Hence, such incarcerated individual IRDs may be used to help soon to be released incarcerated individuals transition. For example, the IRD may be used to communicate with a future employer, or the like. As such, IRDs may be sponsored, or otherwise subsidized by organizations or companies, assisting with the transition of incarcerated individuals into society, or the like.

Such personal controlled-environment facility resident communication and/or media devices, IRDs, IIDs, incarcerated individual personal communications and/or media devices (generally, 130), communal controlled-environment facility resident communication and/or media terminals (135) or the like, may be referred to generally (herein), individually or collectively as "controlled-environment facility resident communication and/or media device(s)." Such controlled-environment facility resident communication and/or media device(s) may have apps installed thereon for access by a controlled-environment facility resident-user. Such apps may include a controlled-environment facility resident calling application, a video visitation application, a controlled-environment facility resident's manual, a controlled-environment facility resident form submittal program, a controlled-environment facility resident commissary ordering application, a music player, a video player, a web browser, a document reading program, an email application, Prison Rape Elimination Act information document, Prison Rape Elimination Act hotline, a legal research application, a job search application, a controlled-environment facility resident grievance submittal application, a sick call app, education app, weather app, video mail, resident information app, one or more games, and/or the like.

In various embodiments, to access communication services, a resident may initiate approved telephone services by lifting the receiver on telephone 125 or IFD 135, and/or otherwise initiating a call, such as by launching a communications app on IRD 130 (or IFD 135). At which time, the resident may be prompted to provide a personal identification number (PIN), other identifying information and/or biometrics. An Interactive Voice Response (IVR) unit (not shown, but which may be integrated into controlled-environment facility communication processing system 105) may generate and play a prompt, or other messages, to the resident on device 125, 130 or 135.

Under the control of controlled-environment facility communication processing system 105, devices 125, 130 or 135 may be capable of connecting to a non-resident's (i.e., a person not incarcerated or otherwise committed to a controlled-environment facility) telephone 140 across a Publicly Switched Telephone Network (PSTN) 145. For example, telephone 140 may be located at a non-resident's home or office, at a resident visitation center, etc. Telephony switch 150, in controlled-environment facility communication processing system 105, may be used to connect calls across PSTN 145. Additionally or alternatively, the non-resident may communicate using device 155, which may be a mobile phone, tablet computing device, personal computer, or the like, which may be connected through an Integrated Services Digital Network (ISDN), Voice-over-IP (VoIP), or packet data network (such as, for example the Internet), a wireless communications network, or the like 120. Telephony router 160 of controlled-environment facility communication processing system 105 is used to route data packets associated with a call connection to device 155. For example, a non-resident party may have a device 155 with a built-in front-facing camera, or the like, and an integrated display (e.g., a smart phone, tablet, etc., as illustrated), a personal computer with a webcam, etc. A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards.

Centralized investigative data aggregation and analysis system 165 may be a platform for providing investigative tools in communication, such as via public network 120, with controlled-environment facility 110, namely controlled-environment facility communication processing system 105, and/or the like. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, app usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as Call Detail Records (CDRs)), so that an investigator may research them through an archive and may be provided access to internal and/or external criminal databases and/or other sources of useful information. Centralized investigative data aggregation and analysis system 165 may, in accordance with embodiments of the present systems and methods, provide collection, processing, analysis, and/or reporting of app usage analysis, for intelligence purposes. Such app usage analysis may be based on for example, frequency, length of use, time of day of use, pattern of use, and/or the like, for one or more (various (particular)) apps, two or more incarcerated individuals being presented with similar app display based usage, etc. Other criteria that may influence whether to analyze app usage may include time remaining for the resident to reside in the facility, a classification of the resident with respect to the facility, offence(s) a resident-incarcerated individual has been convicted of and/or is incarcerated for, and/or the like.

In addition to providing certain visitation and communication operations, controlled-environment facility communication processing system 105 may attempt to ensure that a resident's calls, video conferences, online chats, etc. are performed only with non-residents whose identities, devices, email addresses, phone numbers, etc. are listed in that resident's Pre-Approved Contact (PAC) and/or Pre-Approved Number (PAN) list. Each resident's PAC and/or PAN list(s) may be stored, for example, in (a) database(s) maintained by controlled-environment facility vendor datacenter 115, centralized investigative data aggregation and analysis system 165, and/or the like. In addition to PAC and/or PAN list(s), controlled-environment facility vendor datacenter 115, centralized investigative data aggregation and analysis system 165, and/or the like, may also store Resident Profile Data (RPD), as well as communication and/or visitation rules applicable to each resident. This controlled-environment facility vendor datacenter 115 and/or centralized investigative data aggregation and analysis system 165 database(s) may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. In some implementations, controlled-environment facility communication processing system 105 may be configured to perform communication monitoring operations, such as being configured to monitor and or record communication sessions (e.g., as electronic video files).

Controlled-environment facility resident account management system 170, which may be a separate system, or which may be a part or function of controlled-environment facility vendor datacenter 115, as illustrated, may maintain resident accounts to the benefit of the respective resident, such as resident commissary accounts, resident communications accounts, which may be used to pay for purchase of a controlled-environment facility resident communication and/or media device (130) (and accessories, such a headphones, etc.), communications, such as phone calls, video visitation, internet chats, emails, text messages, or the like. Likewise, in accordance with some embodiments of the present systems and methods controlled-environment facility vendor datacenter 115, centralized investigative data aggregation and analysis system 165, and/or the like, particularly, resident account management system 170 may maintain information about app usage by each controlled-environment facility resident managed.

Computer-based environment components of embodiments of the present systems and methods may include programing and/or hardware to implement such embodiments. This programming may take the form of stored program instructions, programed firmware, or the like, while hardware might take the form of an Application Specific Integrated Circuit (ASIC), or the like, to carry out such aspects of embodiments of the present systems and methods. Thus, in accordance with embodiments of the present systems and methods, a controlled-environment communication and/or media device, IRD 130, or IFD 135, may, as discussed in greater detail below, employ at least one processor and a memory coupled to the processor(s). This memory may, for example, be configured to store program instructions executable by the processor(s). These program instructions may include an operating system for controlled-environment resident communication and/or media device 130 or 135, and a controlled-environment facility resident-user interface program or application that includes program instructions executable by the processor(s). This controlled-environment facility resident-user interface may run on top of, and/or as part of, the operating system. The controlled-environment facility resident-user interface may request and accept identification information (e.g. a resident/incarcerated individual ID number, or the like and a PIN, or the like) from a controlled-environment facility resident operating controlled-environment resident communication and/or media device 130 or 135. Controlled-environment resident communication and/or media device 130 or 135, such as in some embodiments in conjunction with controlled-environment facility communication processing system 105 and/or controlled-environment facility resident account management system 170 verify the identification information. The controlled-environment facility resident-user interface may then present apps available for use by the resident/incarcerated individual-user of controlled-environment resident communication and/or media device 130 or 135. This interface may act as a resident communications platform, and also or alternatively, provide automated login for interface apps, etc. To facilitate automated login or the like, the interface may store login information on device 130 or 135, and/or on a centralized support system, which may be located at the facility (e.g. as a part of controlled-environment facility communication processing system 105, or as a separate system) or in a remote location (e.g. vendor datacenter 115), or a combination of both.

Turning now to FIG. 2, a diagrammatic illustration of example personal controlled-environment resident communication and/or media device 200, showing dynamic presentation of resident-available app icons 205 on controlled-environment facility resident-user interface 210, according to some embodiments. An IRD (130) is illustrated in FIG. 2 as "personal controlled-environment facility resident communication and/or media device 200." However, similar functionality may be provided by an IFD (135), or the like, in accordance with embodiments of the present systems and methods, but will be described herein with reference to personal controlled-environment facility resident communication and/or media device 200.

As noted above, controlled-environment facility resident-user interface 210 may run on top of, and/or as part of, an operating system of personal controlled-environment facility resident communication and/or media device 200. Controlled-environment facility resident-user interface 210 may request and accept identification information (e.g. a resident/incarcerated individual ID number, or the like and a PIN, or the like) from a controlled-environment facility resident operating personal controlled-environment facility resident communication and/or media device 200. Personal controlled-environment facility resident communication and/or media device 200 may, verify such identification information, such as in conjunction with a controlled-environment facility communication processing system (105) and/or a controlled-environment facility resident account management system (170). Controlled-environment facility resident-user interface 210 may, such as following verification of the user's identification information, present, on screen 215 of personal controlled-environment facility resident communication and/or media device 200, icons 205*a* through 205*n* for (launching) apps available for use by the resident/incarcerated individual-user of personal controlled-environment facility resident communication and/or media device 200. In accordance with embodiments of the present systems and methods, icons 205*a* through 205*n* may be arranged on screen 205 in an order based, at least in part, on criteria selected or defined by the controlled-environment facility housing the controlled-environment facility resident, the controlled-environment facility vendor, and/or the like.

The criteria selected or defined by the controlled-environment facility housing the controlled-environment facility resident, the controlled-environment facility vendor, and/or the like, may include arranging the icons on the screen of the controlled-environment facility resident communication and/or media device in an order: with the icons for most frequently (often) used apps presented first; with the icons for apps having the greatest bandwidth availability at the time presented, presented first; with the icons for apps providing the most revenue to the respective one of the facility housing the resident or the controlled-environment facility vendor presented first; in an order based at least in part on a time remaining for the resident to reside in the facility housing the resident; in an order based at least in part on a classification of the resident with respect to the facility housing the resident; with the icons for apps related to an upcoming or occurring holiday presented first; in an order based at least in part on an one or more offences a resident-incarcerated individual has been convicted of and/or is incarcerated for; and/or the like.

This presentation of icons 205*a* through 205*n*, based on criteria selected or defined by the controlled-environment facility housing the controlled-environment facility resident, the controlled-environment facility vendor, and/or the like, may be presented as pre-determined, based on a user selectable default (selected in the operating system of personal controlled-environment facility resident communication and/or media device 200 and/or controlled-environment facility resident-user interface 210). Additionally, or alternatively, as described in greater detail below, with respect to FIG. 3, arrangement of the icons on the screen in the order based on criteria selected or defined by the controlled-environment facility housing the controlled-environment facility resident, the controlled-environment facility vendor, and/or the like, may be adjusted. Such adjustment may be based, at least in part, on rules and regulations of the controlled-environment facility housing the controlled-environment facility resident, a default order established by the controlled-environment facility housing the controlled-environment facility resident, a default order established by a controlled-environment facility vendor for the controlled-environment facility housing the controlled-environment facility, or the like, as applicable with respect to the controlled-environment facility resident. These rules may be flexible enough to change based on preferences of the controlled environment facility or the vendor. For example, consentient with the above, on holidays there may be a promo for a movie rental so the app may dynamically present a movie app, or the like, first.

Also, in accordance with various embodiments of the present systems and methods, controlled-environment resident communication and/or media device 130 or 135 (and hence, personal controlled-environment facility resident communication and/or media device 200) may, automatically store app login information associated with the controlled-environment facility resident-user for each app. In such embodiments, the resident-user may be automatically logged into a selected app using the stored app login information for the selected app upon selection of icon 205 for the selected app. However, in some embodiments, controlled-environment facility resident communication and/or media device 130 or 135 (or 200) may again request and accept identification information from the resident upon selection of an icon (205). In such embodiments, automatically logging the resident-user into the selected app may further entail verifying this (new) identification information (in conjunction with controlled-environment facility communication processing system 105 and/or controlled-environment facility resident account management system 170), and then automatically logging the resident-user into the selected app using the stored app login information in response to verifying the identification information.

FIG. 3 is a flowchart of example process 300 for dynamically presenting resident-available app icons (205) on a controlled-environment facility resident communication and/or media device user interface (210), according to some embodiments. Therein, a controlled-environment facility resident user interface (210) runs on top of, or as part of, an operating system of a controlled-environment facility resident communication and/or media device (130, 135 or 200), at 305. At 310, the controlled-environment facility resident user interface requests and accepts identification information from a controlled-environment facility resident operating the controlled-environment facility resident communication and/or media device. At 315 the controlled-environment facility resident communication and/or media device verifies the identification information, such as, in conjunction with a controlled-environment facility communication processing system (105) and/or a controlled-environment facility resident account management system (170)). At 320, icons (205) to launch apps available for use by the controlled-environment facility resident-user operating the controlled-environment facility resident communication and/or media device (130, 135 or 200) are presented on the controlled-environment facility resident communication and/or media device, via the controlled-environment facility resident interface. These icons may, in accordance with embodiments of the present systems and methods, be dynamically arranged on a screen (215) of the controlled-environment facility resident communication and/or media device in an order that is based on criteria selected or defined by the controlled-environment facility housing the controlled-environment facility resident, a controlled-environment facility vendor (e.g., under control of a vendor datacenter (115)), and/or the like, but, in compliance with rules and regulations of the controlled-environment facility housing the controlled-environment facility resident as applicable with respect to that resident. This arrangement may be with apps being presented first at the top, from the top left, of each screen page (as pre-determined based on a user selectable default), etc.

As noted above, the criteria selected or defined by the controlled-environment facility housing the controlled-environment facility resident or the controlled-environment facility vendor may include arranging the icons on the screen of the controlled-environment facility resident communication and/or media device in an order: with the icons for most frequently (often) used apps presented first; with the icons for apps having the greatest bandwidth availability at the time presented, presented first; with the icons for apps providing the most revenue to the respective one of the facility housing the resident or the controlled-environment facility vendor presented first; in an order based at least in part on a time remaining for the resident to reside in the facility housing the resident; in an order based at least in part on a classification of the resident with respect to the facility housing the resident; with the icons for apps related to an upcoming or occurring holiday presented first; in an order based at least in part on an one or more offences a resident-incarcerated individual has been convicted of and/or is incarcerated for; and/or the like. Thusly, icons may be arranged, dynamically, with the most advantageous (for the controlled-environment facility, the resident and/or the controlled-environment facility vendor) being presented first.

In one example, a determination as to which apps are the most-often used may be based on use by the resident user identified in steps 310 and 315, above. For example, with respect to most often used apps being presented first, where the controlled-environment facility resident communication and/or media device is a communal controlled-environment facility resident communication and/or media terminal (135), the most-often used apps for the resident-user may be retrieved from the controlled-environment facility resident account management system (170), or the like. Whereas if the controlled-environment facility resident communication and/or media device is a personal controlled-environment facility resident communication and/or media device (130) the apps most-often used by the resident-user may be retrieved from the device itself.

As noted above, arrangement of the icons presented on the screen at 320 may not just be in an order based on criteria selected or defined by the controlled-environment facility housing the controlled-environment facility resident, the controlled-environment facility vendor, and/or the like, but may be adjusted. As also noted, such adjustment may be based, at least in part, on rules and regulations of the controlled-environment facility housing the controlled-environment facility resident, that is the controlled-environment facility resident user interface may adjust arrangement of the icons on the screen, at 325, based at least in part on rules and regulations of the controlled-environment facility housing the controlled-environment facility resident, as applicable with respect to the controlled-environment facility resident identified as the resident-user, at 310 and 315. Where icons are presented on the screen in an order based on rules and regulations of the controlled-environment facility, conflicts between the criteria selected or defined by the controlled-environment facility housing the controlled-environment facility resident, the controlled-environment facility vendor, and/or the like and rules and regulations of the controlled-environment facility may be resolved with icons first being presented, at 325, on the on the screen, in an order based on rules and regulations of the controlled-environment facility, and then any remaining icons presented based on the criteria selected or defined by the controlled-environment facility housing the controlled-environment facility resident, the controlled-environment facility vendor, and/or the like.

In another example, where apps are presented in an order based on a resident/incarcerated individual's offenses, violent offenders, or the like, may be presented with bible apps or relaxation apps first.

Also, as noted, arrangement of the icons presented on the screen at 320 may additionally, or alternatively, be adjusted based on a default order established by the controlled-environment facility housing the controlled-environment facility resident, or arrangement may be based on other criteria determined by the vendor or controlled environment facility, etc. For example, at 330, the icons may be presented on the screen in an order based on a default order established by the controlled-environment facility housing the controlled-environment facility resident, such as may be applicable with respect to the controlled-environment facility resident, and conflicts between the criteria selected or defined by the controlled-environment facility housing the controlled-environment facility resident, the controlled-environment facility vendor, and/or the like being presented first and the default order established by the controlled-environment facility may be resolved with icons first being presented, at 330 in an order based on the default order established by the controlled-environment facility, and then any remaining icons presented based on the criteria selected or defined by the controlled-environment facility housing the controlled-environment facility resident, the controlled-environment facility vendor, and/or the like. However, in alternative embodiments, such as, for example where the resident user has selected an option to present most-often-used icons first, conflicts between the order with the icons for most often used apps being presented first and the default order established by the controlled-environment facility may be resolved with icons being presented on the device, via the resident interface arranged on the screen of the device in the order based on the icons for most often used apps being presented first, as at 320, in effect ignoring the default order established by the controlled-environment facility.

As further noted, arrangement of the icons presented on the screen at 320 may additionally, or alternatively, be adjusted based on, a default order established by a controlled-environment facility vendor for the controlled-environment facility housing the controlled-environment facility resident. For example, at 335, the icons may be presented on the screen in an order based on a default order established by the controlled-environment facility vendor, such as may be applicable with respect to the controlled-environment facility resident, and conflicts between the order with the criteria selected or defined by the controlled-environment facility housing the controlled-environment facility resident, the controlled-environment facility vendor, and/or the like and the default order established by the controlled-environment facility vendor may be resolved with icons first being presented, at 335 in an order based on the default order established by the controlled-environment facility vendor, and then any remaining icons presented based on criteria selected or defined by the controlled-environment facility housing the controlled-environment facility resident, the controlled-environment facility vendor, and/or the like. However, in alternative embodiments, such as where the resident user has selected an option to present most-often-used icons first, conflicts between the order with the icons for most often used apps being presented first and the default order established by the controlled-environment facility vendor may be resolved with icons being presented on the device, via the resident interface arranged on the screen of the device in the order based on the icons for most often used apps being presented first, as at 320, in effect ignoring the default order established by the controlled-environment facility vendor.

For example, the criteria selected or defined by the controlled-environment facility housing the controlled-environment facility resident and/or the controlled-environment facility vendor, and/or rules and regulations of the controlled-environment facility, default order established by the controlled-environment facility, default order established by the vendor for the controlled-environment facility, or the like, such as applied at 325, 330, 335, above, or the like, may call for, or result in, presenting certain apps, first on the screen. For example, the facility and/or vendor may direct, such as during development or provisioning of the device(s), that icons for apps related to communications, such as a phone call app, video visitation app, internet chat app, email app, text message app, e-messaging app, and/or the like be displayed first, before arrangement of the remaining apps based on criteria selected or defined by the controlled-environment facility housing the controlled-environment facility resident, the controlled-environment facility vendor, and/or the like. Such remaining apps may include third-party apps, such as one or more law library apps, religion-related app(s), or the like, some of which may have been downloaded by the resident-user, in compliance with rules and regulations of the resident's controlled-environment facility, as discussed above. Alternatively, the presentation of communication apps first may be (separately based on resident-user usage). For example, if the resident-user uses e-messaging on a regular (e.g., daily) basis, then e-messaging may appear first on the screen, followed by the other communication apps (in the order of usage, then the remaining apps), based on their usage, as discussed above.

Likewise, or alternatively, the criteria selected or defined by the controlled-environment facility housing the controlled-environment facility resident and/or the controlled-environment facility vendor, or the facility and/or vendor may direct, during development or provisioning of the device(s), that icons for apps that provide income to the facility and/or vendor be presented first. Such apps that provide income to the facility and/or vendor may include, in addition to communications apps, entertainment apps, such as music, video or game apps, for which the facility and/or vendor may receive a portion of a purchase price, royalty, subscription, or the like, paid by the resident-user or on behalf of the resident for content for use in such apps, etc. Such presentation based on income, may be further refined based on profit margins generated, or the like.

Further, and somewhat related thereto, the criteria selected or defined by the controlled-environment facility housing the controlled-environment facility resident and/or the controlled-environment facility vendor, and/or the facility and/or vendor may direct, during development and/or provisioning of the device(s), or during use, that icons for apps that consume greater bandwidth be displayed after other apps, such as to manage such bandwidth and/or maximize profit. For example, low bandwidth communications apps may be presented first, such as presentation of internet chat, email, text messaging, e-messaging, and/or the like, first, followed by mid-bandwidth apps, such as voice calling, next and finally high-bandwidth application such as video visitation. For example, the criteria selected, defined, or otherwise directed by the controlled-environment facility housing the controlled-environment facility resident and/or the controlled-environment facility vendor may call for the icons to be arranged based on what is available with the controlled-environment facility communications system, or the like. In one example, if there is extra bandwidth the criteria may call for presenting video visitation, or the like first. Alternatively, if there is not a lot of bandwidth available, embodiments of the present systems and methods may dynamically suggest a smaller usage app such as e-messaging, texting, or the like. In this regard, embodiments of the present systems and methods are flexible enough to switch based on needs or preferences of the facility or vendor. Thus, in accordance with the foregoing, presentation of the icons may be based on available resources, presenting the most advantageous icons first or on the top left.

Additionally, the facility may be provided an option, in accordance with embodiments of the present systems and methods, to enable and disable the present dynamic ordering of app presentation based on usage or other ordering based on preferences of the facility controlled environment or the vendor.

In embodiments where the controlled-environment facility resident communication and/or media device is a communal controlled-environment facility resident communication and/or media terminal (135) the present systems and methods may facilitate use of the terminal so as to more readily free-up the terminal for use by a next resident/incarcerated individual.

Further sorting of content under a selected app may be provided in accordance with embodiments of the present systems and methods, for example, when a particular communications app is selected, contacts available for communication under this app may be sorted based on usage, such as frequency and/or duration (amount of content) of communications with the contacts (e.g., recent calls).

Various elements of the present systems and methods for dynamic presentation of icons for available apps on controlled-environment facility resident communication and/or media device user interfaces may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware.

Embodiments of the present systems and methods for dynamic presentation of icons for resident-user-available apps on controlled-environment facility resident communication and/or media device user interfaces, as described herein, may be implemented at least in part as, or executed, at least in part, by one or more computer systems. One such computer system is illustrated in FIG. 4. In various embodiments, computer system 400 may be a server, a mainframe computer system, a workstation, a network computer, a desktop computer, a laptop, a tablet computing device, media player, or the like. For example, in some cases, computer 400 may implement one or more steps of example process 300 described above with respect to FIG. 3, and/or a computer system such as computer system 400 may be used as part of, one or more of: controlled environment facility communication processing system 105; controlled-environment facility vendor datacenter 115; controlled-environment facility resident communication and/or media devices 125, 130 or 135; non-resident communications devices 140 or 155; centralized investigative data aggregation and analysis system 165; resident account management system 170; and/or the like. In various embodiments two or more of these computer systems may be configured to communicate with each other in any suitable way, such as, for example, via public network 120, which may be the Internet, or the like, as discussed above, via a local area network using wired or wireless functionality, etc.

As illustrated, computer system 400 includes one or more processors 410A-N coupled to a system memory 420 via bus 430. Computer system 400 further includes a network interface 440 coupled to bus 430, and one or more I/O controllers 450, which in turn are coupled to peripheral devices such as cursor control device 460, keyboard 470, display(s) 480, etc. Each of I/O devices 460, 470, 480 may be capable of communicating with I/O controllers 450, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 400 may be a single-processor system including one processor 410A, or a multi-processor system including two or more processors 410A-N (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or another dedicated graphics-rendering device.

System memory 420 may be configured to store program instructions and/or data accessible by processor 410. In various embodiments, system memory 420 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 420 as program instructions 425 and data storage 435, respectively. In other embodiments, program instructions and/or data may be received, sent, or stored upon different types of computer-accessible media or on similar media separate from system memory 420 or computer system 400.

A computer-accessible medium may include any tangible and/or non-transitory storage media or memory media such as electronic, magnetic, or optical media—e.g., disk or CD/DVD-ROM coupled to computer system 400 via bus 430. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 430 may be configured to coordinate I/O traffic between processor 410, system memory 420, and any peripheral devices in the computer system, including network interface 440 or other peripheral interfaces, such as I/O devices 460, 470, 480. In some embodiments, bus 430 may perform any necessary protocol, timing, or other data transformations to convert data signals from one component (e.g., system memory 420) into a format suitable for use by another component (e.g., processor 410). In some embodiments, bus 430 may include support for devices attached through various types of peripheral buses, such as a variant of the Peripheral Component Interconnect (PCI) bus standard or the Universal Serial Bus (USB) standard, for example. In some embodiments, the function of bus 430 may be split into two or more separate components, such as a northbridge chipset and a southbridge chipset, for example. In addition, in some embodiments some or all the functionality of bus 430, such as an interface to system memory 420, may be incorporated directly into processor(s) 410A-N.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 450 may, in some embodiments, enable communications with one or more display terminals, keyboards, keypads, touchpads, scanning devices, voice or optical recognition devices, mobile devices, or any other devices suitable for entering or retrieving data by one or more computer system 400. Multiple I/O controllers 450 may be present in computer system 400 or may be distributed on various nodes of computer system 400. In some embodiments, I/O devices may be separate from computer system 400 and may interact with one or more nodes of computer system 400 through a wired or wireless connection, such as over network interface 440.

As shown in FIG. 4, system memory 420 may include program instructions 425, configured to implement certain embodiments described herein, and data storage 435, comprising various data may be accessible by program instructions 425. In an embodiment, program instructions 425 may include software elements, which may be configured to affect the operations discussed in FIGS. 1 through 3. Program instructions 425 may be implemented in various embodiments using any desired programming language, scripting language, or combination of programming languages and/or scripting languages (e.g., C, C++, C#, JAVA®, JAVASCRIPT®, PERL®, etc.). Data storage 435 may include data that may be used in these embodiments (e.g., recorded communications, profiles for different modes of operations, etc.). In other embodiments, other or different software elements and data may be included.

A person of ordinary skill in the art will appreciate that computer system 400 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 4, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controlled-environment facility resident communication and/or media device comprising:
   at least one processor; and a memory coupled to the at least one processor, the memory configured to store program instructions executable by the at least one processor, the program instructions comprising:
   a controlled-environment facility resident communication and/or media device operating system; and
   controlled-environment facility resident user interface program instructions executable by the at least one processor to cause the controlled-environment facility resident communication and/or media device to:
      run the controlled-environment facility resident user interface on top of, or as part of, the operating system;
      request and accept identification information from a controlled environment facility resident operating the controlled-environment facility resident communication and/or media device;
      verify the identification information; present icons to launch application programs available for use by the controlled-environment facility resident on a screen of the controlled-environment facility resident communication and/or media device; and
      dynamically arrange the icons on the screen of the controlled-environment facility resident communication and/or media device in accordance with criteria selected or defined by the controlled-environment facility housing the controlled environment facility resident or a controlled-environment facility vendor, in compliance with rules and regulations of the controlled-environment facility housing the controlled-environment facility resident as applicable with respect to the controlled-environment facility resident;
      wherein the criteria selected or defined by the controlled-environment facility housing the controlled-environment facility resident or the controlled environment facility vendor comprises arranging the icons on the screen of the controlled-environment facility resident communication and/or media device in an order with the icons for application programs having the greatest bandwidth availability at the time presented first or with the icons for application programs providing the most revenue to the respective one of the controlled-environment facility housing the controlled-environment facility resident or the controlled environment facility vendor presented first.

2. The controlled-environment facility resident communication and/or media device of claim 1, wherein the criteria selected or defined by the controlled-environment facility housing the controlled-environment facility resident or the controlled-environment facility vendor comprises arranging the icons on the screen of the controlled-environment facility resident communication and/or media device in an order with the icons for most frequently used application programs presented first.

3. The controlled-environment facility resident communication and/or media device of claim 1, wherein the criteria selected or defined by the controlled-environment facility housing the controlled-environment facility resident or the controlled-environment facility vendor comprises further arranging the icons on the screen of the controlled-environment facility resident communication and/or media device in an order based at least in part on a time remaining for the controlled-environment facility resident to reside in the controlled-environment facility housing the controlled-environment facility resident.

4. The controlled-environment facility resident communication and/or media device of claim 1, wherein the criteria selected or defined by the controlled-environment facility housing the controlled-environment facility resident or the controlled-environment facility vendor comprises further arranging the icons on the screen of the controlled-environment facility resident communication and/or media device in an order based at least in part on a classification of the controlled-environment facility resident with respect to the controlled-environment facility housing the controlled-environment facility resident.

5. The controlled-environment facility resident communication and/or media device of claim 1, wherein the criteria selected or defined by the controlled-environment facility housing the controlled-environment facility resident or the controlled-environment facility vendor comprises further arranging the icons on the screen of the controlled-environment facility resident communication and/or media device in an order with the icons for application programs related to an upcoming or occurring holiday presented first.

6. The controlled-environment facility resident communication and/or media device of claim 1, wherein the controlled-environment facility is a correctional facility and the resident is an incarcerated individual.

7. The controlled-environment facility resident communication and/or media device of claim 6, wherein the criteria selected or defined by the correctional facility housing the incarcerated individual or the correctional facility vendor comprises further arranging the icons on the screen of the controlled-environment facility resident communication and/or media device in an order based at least in part on an one or more offences the incarcerated individual has been convicted of and/or is incarcerated for.

8. The controlled-environment facility resident communication and/or media device of claim 1, wherein the controlled-environment facility resident communication and/or media device is a personal controlled-environment facility resident communication and/or media device.

9. The controlled-environment facility resident communication and/or media device of claim 1, wherein the controlled-environment facility resident communication and/or media device is a communal controlled-environment facility resident communication and/or media terminal.

10. A method for providing a controlled-environment facility resident user interface on controlled-environment facility resident communication and/or media devices, the method comprising:
running a controlled-environment facility resident user interface on top of, or as part of, an operating system of a controlled-environment facility resident communication and/or media device;
requesting and accepting, by the controlled-environment facility resident user interface, identification information from a controlled-environment facility resident operating the controlled-environment facility resident communication and/or media device;
verifying, by the controlled-environment facility resident communication and/or media device, the identification information;
presenting, by the controlled-environment facility resident user interface, on the screen of the controlled-environment facility resident communication and/or media device, icons to launch application programs available for use by the controlled-environment facility resident operating the controlled-environment facility resident communication and/or media device, dynamically arranging the icons on the screen of the controlled-environment facility resident communication and/or media device in accordance with criteria selected or defined by the controlled-environment facility housing the controlled-environment facility resident or a controlled-environment facility vendor, in compliance with rules and regulations of the controlled-environment facility housing the controlled-environment facility resident as applicable with respect to the controlled-environment facility resident;
wherein the criteria selected or defined by the controlled-environment facility housing the controlled-environment facility resident or the controlled-environment facility vendor comprises arranging the icons on the screen of the controlled-environment facility resident communication and/or media device in an order with the icons for application programs having the greatest bandwidth availability at the time presented first or with the icons for application programs providing the most revenue to the respective one of the controlled-environment facility housing the controlled-environment facility resident or the controlled-environment facility vendor presented first.

11. The method of claim 10, wherein the criteria selected or defined by the controlled-environment facility housing the controlled-environment facility resident or the controlled-environment facility vendor comprises further arranging the icons on the screen of the controlled-environment facility resident communication and/or media device in an order with the icons for most frequently used application programs presented first.

12. The method of claim 10, wherein the criteria selected or defined by the controlled-environment facility housing the controlled-environment facility resident or the controlled-environment facility vendor comprises further arranging the icons on the screen of the controlled-environment facility resident communication and/or media device in an order based at least in part on a time remaining for the controlled-environment facility resident to reside in the controlled-environment facility housing the controlled-environment facility resident.

13. The method of claim 10, wherein the criteria selected or defined by the controlled-environment facility housing the controlled-environment facility resident or the controlled-environment facility vendor comprises further arranging the icons on the screen of the controlled-environment facility resident communication and/or media device in an order based at least in part on a classification of the controlled-environment facility resident with respect to the controlled-environment facility housing the controlled-environment facility resident.

14. The method of claim 10, wherein the criteria selected or defined by the controlled-environment facility housing the controlled-environment facility resident or the controlled-environment facility vendor comprises further arranging the icons on the screen of the controlled-environment facility resident communication and/or media device in an order with the icons for application programs related to an upcoming or occurring holiday presented first.

15. The method of claim 10, wherein the controlled-environment facility is a correctional facility and the resident is an incarcerated individual.

16. The method of claim 15, wherein the criteria selected or defined by the correctional facility housing the incarcerated individual or the correctional facility vendor comprises further arranging the icons on the screen of the controlled-environment facility resident communication and/or media device in an order based at least in part on one or more offences the incarcerated individual has been convicted of and/or is incarcerated for.

17. A non-transitory computer-readable storage medium having program instructions stored thereon that, upon execution by a controlled-environment facility resident communication and/or media device, cause the controlled-environment facility resident communication and/or media device to:
run a controlled-environment facility resident user interface on top of, or as part of, an operating system of the controlled-environment facility resident communication and/or media device;
request and accept identification information from a controlled-environment facility resident operating the controlled-environment facility resident communication and/or media device; verify the identification information;
present icons to launch application programs available for use by the controlled-environment facility resident on a screen of the controlled-environment facility resident communication and/or media device; and
dynamically arrange the icons on the screen of the controlled-environment facility resident communication and/or media device in accordance with criteria selected or defined by the controlled-environment facility housing the controlled-environment facility resident or a controlled-environment facility vendor, in compliance with rules and regulations of the controlled-environment facility housing the controlled-environment facility resident as applicable with respect to the controlled-environment facility resident;
wherein the criteria selected or defined by the controlled-environment facility housing the controlled-environment facility resident or the controlled-environment facility vendor comprises arranging the icons on the screen of the controlled-environment facility resident communication and/or media device in an order with the icons for application programs having the greatest bandwidth availability at the time presented first or with the icons for application programs providing the most revenue to the respective one of the controlled-environment facility housing the controlled-environment facility resident or the controlled-environment facility vendor presented first.

* * * * *